United States Patent
Pizlo et al.

(10) Patent No.: US 8,406,567 B2
(45) Date of Patent: Mar. 26, 2013

(54) RECONSTRUCTION OF SHAPES OF NEAR SYMMETRIC AND ASYMMETRIC OBJECTS

(75) Inventors: Zygmunt Pizlo, Indianapolis, IN (US); Tadamasa Sawada, West Lafayette, IN (US); Yunfeng Li, Whitewater, WI (US)

(73) Assignee: Purdue Research Foundation, West Lafayette, IN (US)

( * ) Notice: Subject to any disclaimer, the term of this patent is extended or adjusted under 35 U.S.C. 154(b) by 703 days.

(21) Appl. No.: 12/581,604

(22) Filed: Oct. 19, 2009

(65) Prior Publication Data

US 2010/0079450 A1    Apr. 1, 2010

Related U.S. Application Data

(63) Continuation-in-part of application No. 11/971,898, filed on Jan. 9, 2008, now Pat. No. 8,224,065.

(60) Provisional application No. 61/176,394, filed on May 7, 2009, provisional application No. 61/106,220, filed on Oct. 17, 2008.

(51) Int. Cl.
*G06K 9/36* (2006.01)
*G06K 9/00* (2006.01)

(52) U.S. Cl. ...................................... 382/285; 382/154

(58) Field of Classification Search .................. 382/103, 382/154, 209, 233, 203; 345/418–420
See application file for complete search history.

(56) References Cited

PUBLICATIONS

Li, et al. (A computational model that recovers the 3D shape of an object from a single 2D retinal representation), available online Jul. 14, 2008, pp. 980-991.*

* cited by examiner

*Primary Examiner* — Daniel Mariam
(74) *Attorney, Agent, or Firm* — Maginot, Moore & Beck, LLP

(57) ABSTRACT

A system processes 2D images of 2D or 3D objects, creating a model of the object that is consistent with the image and as veridical as the perception of the 2D image by humans. Vertices of the object that are hidden in the image are recovered by using planarity and symmetry constraints. The 3D shape is recovered by maximizing 3D compactness of the recovered object and minimizing its surface area. In some embodiments, these two criteria are weighted by using the geometric mean.

18 Claims, 8 Drawing Sheets

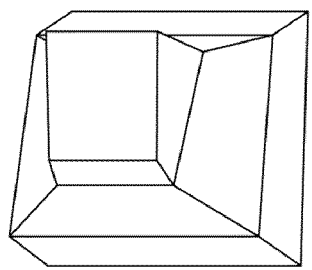
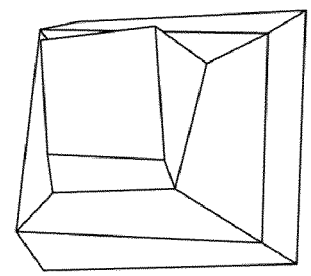
Fig. 1a  Fig. 1b
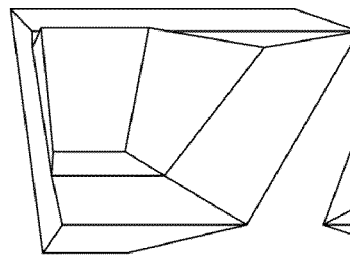
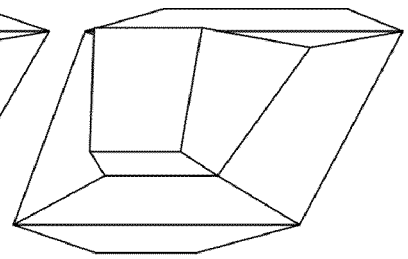
Fig. 1c  Fig. 1d
Fig. 2a 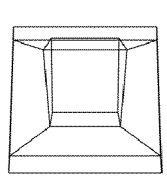 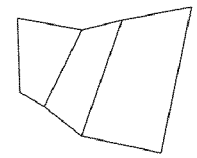 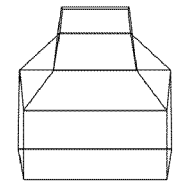
Fig. 2b 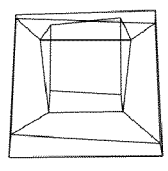 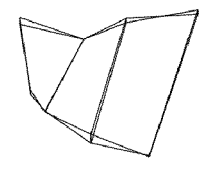 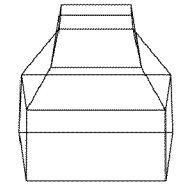
Fig. 2c 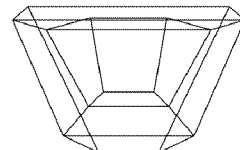 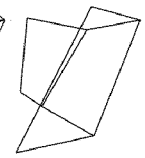 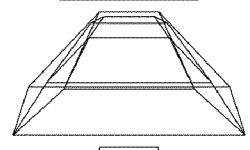
Fig. 2d 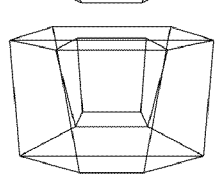 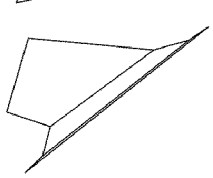 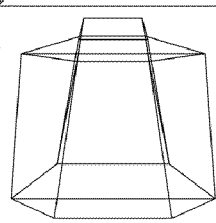
FRONT  SIDE  TOP

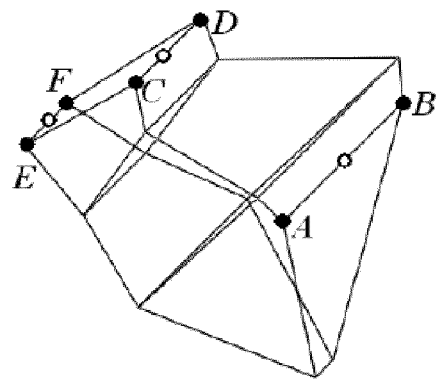
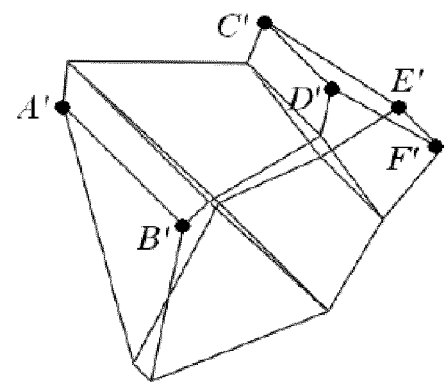
Fig. 3a  Fig. 3b
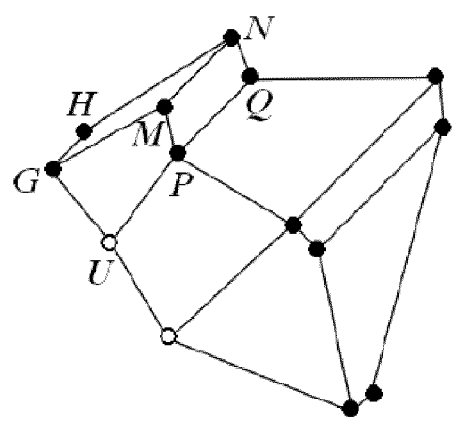
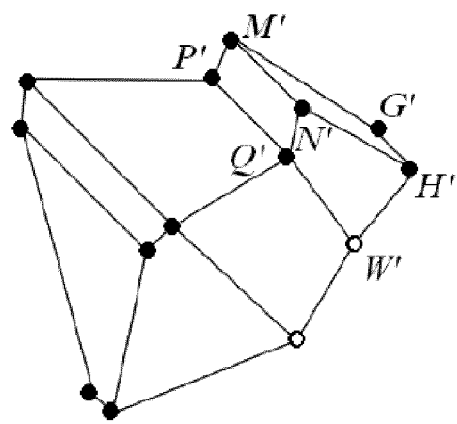
Fig. 4a  Fig. 4b
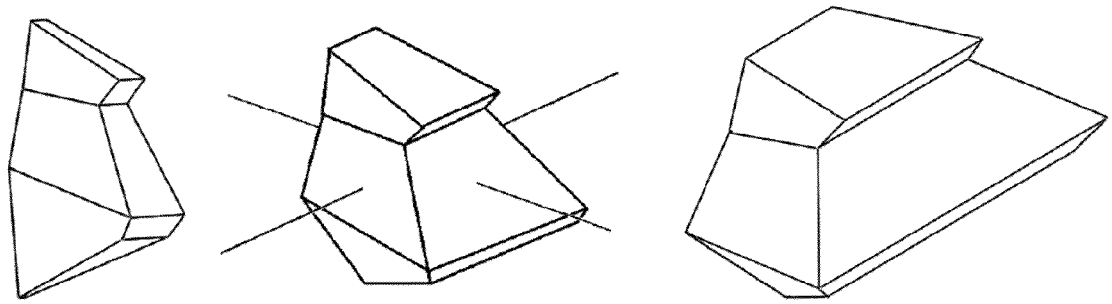
Fig. 5

US 8,406,567 B2

RECONSTRUCTION OF SHAPES OF NEAR SYMMETRIC AND ASYMMETRIC OBJECTS

REFERENCE TO RELATED APPLICATIONS

This application claims priority to U.S. Provisional Application No. 61/106,220, filed Oct. 17, 2008, with title "Reconstruction of Shapes of Near Symmetric and Asymmetric Objects," and U.S. Provisional Application No. 61/176,394, filed May 7, 2009, with title "Recovery of 3D Shapes from Two 2D Views," and is a continuation-in-part of U.S. application Ser. No. 11/971,898, filed Jan. 9, 2008, with title "Reconstruction of Shapes of Objects from Images", which issued on Jul. 17, 2012, as U.S. Pat. No. 8,224,065.

STATEMENT REGARDING FEDERALLY SPONSORED RESEARCH

This invention was made with government support under grant IIS-0533968 awarded by the National Science Foundation and grant 31-1380-101 awarded by the U.S. Department of Energy. The government has certain rights in the invention. The U.S. Government has a paid-up license in this invention and the right in limited circumstances to require the patent owner to license others on reasonable terms as provided for by the terms of grant IIS-0533968 of the National Science Foundation and grant 31-1380-101 of the U.S. Department of Energy.

FIELD

The present invention relates to systems and methods for image analysis. More specifically, the present invention relates to processing of one or two 2D images to obtain a 3D model of an object therein.

BRIEF DESCRIPTION OF THE DRAWINGS

FIGS. 1a-1d are orthographic views of symmetric and asymmetric 3D polyhedra that were the subject of application of a system according to the present disclosure.

FIGS. 2a-2d are front, side, and top views of the 3D polyhedra from FIG. 1 that were the subject of application of the system.

FIGS. 3a and 3b are wire-frame depictions of symmetric, transparent shapes analyzed by the system.

FIGS. 4a and 4b are wire-frame depictions of symmetric, opaque shapes analyzed by the system.

FIG. 5 illustrates versions of a shape with three distinct aspect ratios.

DESCRIPTION

Figure 6:
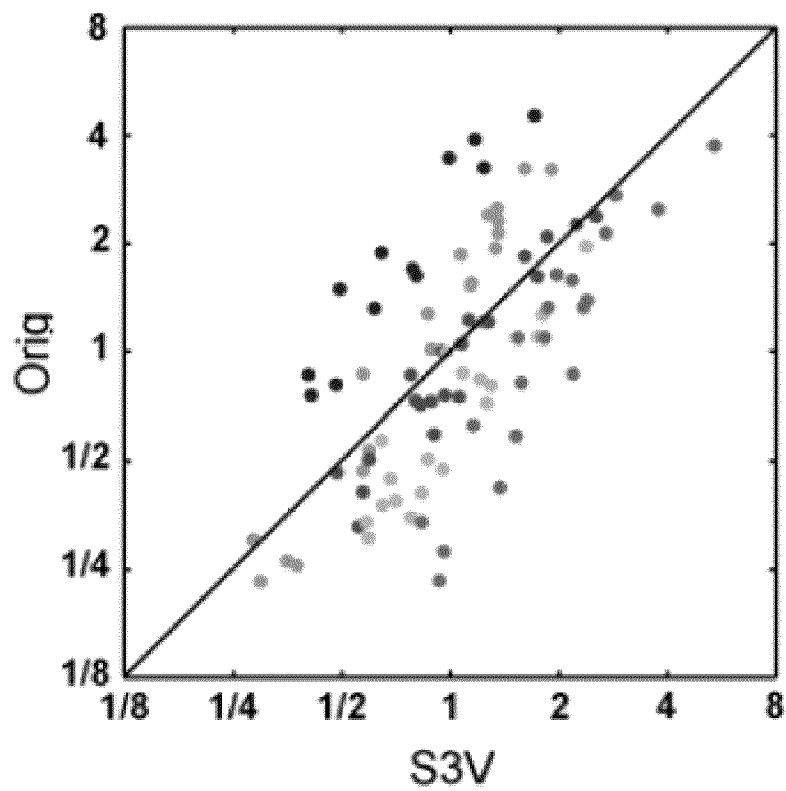
FIG. 6 is a scatter plot of the relation between the aspect ratio of the original 3D shape and the aspect ratio recovered by the present system.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, one form of the present system is a computing system having a processor and memory and programs to prepare 3D data models of objects from 2D images of those objects. In some variations, the 3D model is made up of pairs of points that correspond to vertices of the object. Sometimes the pairs of points are coplanar, while at other times they are not. In various embodiments, the system uses information from the image to approximate the shape of the object with a symmetric shape, determines the locations of vertices and edges that correspond to hidden vertices and edges in the image, then deforms the reconstructed image from its symmetric state so that it is again consistent with the original 2D image. Other embodiments will, of course, occur to those skilled in the art in view of the present disclosure.

Figure 13:
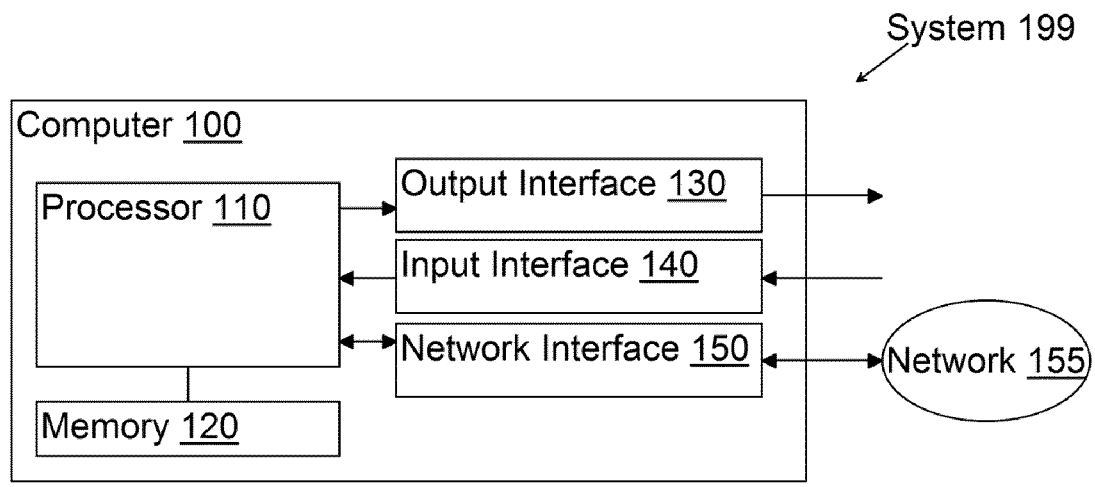
FIG. 13 is a block diagram of a computing device that embodies system described herein.

In some embodiments described herein, the computing resources that are applied generally take the form shown in FIG. 13. Computer 100, as this example will generically be referred to, includes processor 110 in communication with memory 120, output interface 130, input interface 140, and network interface 150. Power, ground, clock, and other signals and circuitry are omitted for clarity, but will be understood and easily implemented by those skilled in the art.

With continuing reference to FIG. 13, network interface 150 in this embodiment connects computer 100 a data network (such as to network 155) for communication of data between computer 100 and other devices attached to the network. Input interface 140 manages communication between processor 110 and one or more push-buttons, UARTs, IR and/or RF receivers or transceivers, decoders, or other devices, as well as traditional keyboard and mouse devices. Output interface 130 provides a video signal to display 160, and may provide signals to one or more additional output devices such as LEDs, LCDs, or audio output devices, or a combination of these and other output devices and techniques as will occur to those skilled in the art.

Processor 110 in some embodiments is a microcontroller or general purpose microprocessor that reads its program from memory 120. Processor 110 may be comprised of one or more components configured as a single unit. Alternatively, when of a multi-component form, processor 110 may have one or more components located remotely relative to the others. One or more components of processor 110 may be of the electronic variety including digital circuitry, analog circuitry, or both. In one embodiment, processor 110 is of a conventional, integrated circuit microprocessor arrangement, such as one or more CORE 2 QUAD processors from INTEL Corporation of 2200 Mission College Boulevard, Santa Clara, Calif. 95052, USA, or ATHLON or PHENOM processors from Advanced Micro Devices, One AMD Place, Sunnyvale, Calif. 94088, USA. In alternative embodiments, one or more reduced instruction set computer (RISC) processors, application-specific integrated circuits (ASICs), general-purpose microprocessors, programmable logic arrays, or other devices may be used alone or in combination as will occur to those skilled in the art.

Likewise, memory 120 in various embodiments includes one or more types such as solid-state electronic memory, magnetic memory, or optical memory, just to name a few. By way of non-limiting example, memory 120 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. Also, memory 120 is volatile, nonvolatile, or a hybrid combination of volatile and nonvolatile varieties.

1. Computational Model of Detecting 3D Symmetry

Some embodiments of the present system implement a model for detecting 3D shape in two main stages. In the first stage, a polyhedron is recovered from a 2D image. In the second stage, the asymmetry of the recovered polyhedron is measured and compared to a criterion in order to decide whether or not the recovered 3D shape is symmetric. In testing, the performance of the system was evaluated using 3D simulated polyhedral shapes. Note that this illustrated embodiment of the system does not perform image segmentation, though others will, as will occur to those skilled in this type of technology. Specifically, the system is provided with visible contours of a 3D shape, as well as information indicating which vertices in the 3D shape are symmetric and which contours are planar. For example, the system is given two possibilities for the orientation of the symmetry plane (vertical and horizontal) in the case of the objects shown in FIGS. 1a-1d. The system evaluates the symmetry of both interpretations and chooses the more symmetric one.

Note that in this embodiment the 2D orthographic image is the only input data to the model (as to the human visual system). However, the 2D image is not the only information used by the model (and by the human visual system). The model (as in the human visual system) also uses a priori shape constraints. The constraints are used because 3D shape recovery from a single 2D image is underconstrained. So, even though the 2D image is the only input data for the discrimination between symmetric and asymmetric 3D shapes, the 2D image itself doesn't have enough information to perform this discrimination. Reliable discrimination can typically be performed after the 3D shape is recovered through the application of a priori constraints. In other words, the a priori constraints add information not only for the purpose of recovering the 3D shape, but also for the purpose of discrimination between two categories of 3D shapes (symmetric vs. asymmetric).

The computational details are explained below. Specifically, the second stage, in which the asymmetry of the recovered 3D shape is measured, is described in the next section. Understanding the operation of this second stage is helpful for one's understanding of how the model's performance was compared to that of human test participants. The first stage, in which an approximately symmetric 3D shape is recovered from a single 2D image is described in Section 2.

1.1 Measure of Asymmetry of the Recovered Polyhedron

Before the asymmetry of a 3D shape is evaluated, the shape is recovered. As discussed elsewhere herein, recovery of a unique 3D shape from a single 2D image is underconstrained. In order to produce a unique 3D shape, one has to restrict the family of possible 3D interpretations by using a priori constraints. Given a 2D orthographic image of a symmetric 3D shape, the system begins by producing a virtual image of this shape (see Section 2). Next, the system constructs a one-parameter family of 3D symmetric shapes consistent with the given 2D image. Finally, a 3D shape with maximal 3D compactness is selected as the recovered shape. 3D compactness is defined in this example as $V^2/S^3$, where V is the volume and S is the surface area of the 3D shape, though other usable compactness metrics will occur to those skilled in the art. In the case of opaque shapes, planarity of faces themselves or planarity in conjunction with symmetry can be used to recover the back part of the polyhedron. When the 3D shape is asymmetric, this method must be modified. Specifically, the 2D image is first modified to make it consistent with a 3D symmetric shape, then the 3D shape is recovered as described below. Finally, the 3D symmetric shape is distorted in 3D so that it becomes consistent with the given 2D image (see Section 2).

Now that the 3D shape is recovered, one can evaluate how asymmetric it is. This is done in the present embodiment by comparing the two halves of the 3D shape, though other techniques will occur to those skilled in this area of technology. If the shape is perfectly symmetric, the two halves will be identical. If the 3D shape is only approximately symmetric, the two halves will only be approximately identical. This embodiment uses the sum of squared differences between the corresponding 2D angles, $\alpha_\alpha$ and $\alpha_{counterpart(\alpha)}$, of the polyhedron H, as a metric:

$$ap(H) = \sum_a (a_a - a_{counterpart(a)})^2. \tag{1}$$

The greater ap(H) is, the more asymmetric H is. In a simulation experiment, a criterion k was used, to which ap(H) was compared, in order to decide between symmetric and asymmetric 3D shapes. The criterion is needed to make the discrimination robust in the presence of visual noise. Noise is always present in real retinal and camera images. Furthermore, due to the discrete nature of sensory receptors, there is always uncertainty about the positions of points and features in the image. As a result of noise and uncertainty, the recovered 3D shape is never perfectly symmetric even if the image was actually produced by a perfectly symmetric 3D shape. This means that the asymmetry measure ap(H) is, in practice, always positive. In order to classify symmetric 3D shapes as symmetric, the system must interpret small values of ap(H) as representing perfect 3D symmetry. Small values are defined as values lower than k.

The measure ap(H) defined in (1) can correctly detect asymmetry in the case of Type-A asymmetric 3D polyhedra that were used in our experiment (see FIGS. 1b, 2b). However, it will not detect asymmetry in the case of Type-B asymmetric polyhedra (see FIGS. 1c, 1d, 2c, 2d). The reason is that every image of a Type-B asymmetric polyhedron is actually consistent with a 3D symmetric interpretation. As a result, the present system will always recover a symmetric polyhedron from Type-B asymmetric polyhedron input. This means that we need another measure of 3D symmetry.

An examination of the 3D symmetric shapes recovered from images produced by Type-B asymmetric polyhedra shows that the recovered shapes have surfaces with self-intersection. An example of such a case is shown in FIGS. 1c and 2c. Self-intersecting surfaces are not "valid" in the sense that some vertices and edges that should not be visible in the 2D image are actually visible. They should not be visible because the surfaces are assumed to be opaque. In other words, the recovered symmetric shapes with self-intersections are not fully consistent with the given images. It follows that 3D interpretations that are consistent with the given 2D image are not symmetric. There are also other cases of Type-B asymmetric polyhedra, in which self-intersection of surfaces does not occur, but the 3D shape is correctly perceived by observers as asymmetric. Such a case is shown in FIGS. 1d and 2d. An examination of the recovered 3D shape shows that it tends to be "thin" and have very low 3D compactness. This observation suggests that the human visual system "prefers" compact asymmetric 3D shapes over symmetric non-compact ones. It follows that 3D compactness is a more important prior to the human mind than 3D symmetry. Interestingly, compactness can also be used to detect 3D recovered shapes that have self-intersecting surfaces because such shapes tend to have low compactness. Indeed, using compactness alone allows one to detect most self-intersecting 3D shapes. To test this, we generated 800 Type-B asymmetric polyhedra and recovered 3D symmetric shapes from their 2D images. One hundred six (106) of the recovered 3D shapes had self-intersecting surfaces and most of these shapes (101 out of 106) had very low compactness.

Note that the self intersection makes an upper bound of compactness smaller, as compared to objects without self intersection. Take an object O with a self intersection of its surface. Let the self intersection separate the surface into two surfaces with surface areas $S_a$ and $S_b$. Compactness of this object is maximized when these two surfaces form two spheres that contact each other at the self intersection:

$$\max(C_o) = \frac{(4\pi r_a^3/3 + 4\pi r_b^3/3)^2}{(S_a + S_b)^3}$$

$$= \left(\frac{4\pi}{3}\right)^2 \cdot \frac{\left(\sqrt{S_a/4\pi}^3 + \sqrt{S_b/4\pi}^3\right)^2}{(S_a + S_b)^3}$$

$$= \frac{1}{36\pi}\left(\frac{S_a^{1.5} + S_b^{1.5}}{(S_a + S_b)^{1.5}}\right)^2 < \frac{1}{36\pi}$$

where $C_o$ is compactness of the object, and $r_a$ and $r_b$ are radii of spheres with surface areas $S_a$ and $S_b$. Recall that $1/(36\pi)$ is the upper bound of 3D compactness (the upper bound corresponds to a single sphere). So, self intersection of the surface of the object makes an upper bound of its compactness smaller.

2. A New Method for Recovering a 3D, Approximately Symmetric Polyhedron from a Single 2D Orthographic Image 2.1 Alignment of Axis of Symmetry First, the 2D image of the polyhedron is rotated in the image plane (in the clockwise direction) so that the projected symmetry line segments become horizontal. Two rotation angles that differ by 180 degrees can accomplish this. The smaller of these two angles is used. This rotation is unique when all projected symmetry line segments are parallel. When these segments are not parallel (as is the case with an image of an asymmetric polyhedron), the rotation makes the average orientation of the projected symmetry line segments horizontal:

$$R_{2D}(-\phi)p_i = P_i. \quad (2)$$

(2) can be written explicitly as follows:

$$\begin{bmatrix} \cos\phi & \sin\phi \\ -\sin\phi & \cos\phi \end{bmatrix} \cdot \begin{bmatrix} x_i \\ y_i \end{bmatrix} = \begin{bmatrix} X_i \\ Y_i \end{bmatrix}$$

where $p_i = [x_i, y_i]^t$ and $P_i = [X_i, Y_i]^t$ are positions of a projected vertex i before and after the rotation, and $\phi$ is the average orientation of the projected symmetry line segments. Let a symmetric counterpart of the vertex i be a vertex j ($p_j = [x_j, y_j]^t$ and $P_j = [X_j, Y_j]^t$).

2.2 Correction of the 2D Image

When the projected symmetry lines are all parallel in the 2D image, this step is skipped. When they are not parallel, the system changes (corrects) their orientations so that they become parallel. This way, the corrected image will be consistent with a 3D symmetric interpretation. Specifically, each projected symmetry line segment is made parallel to the x-axis by applying the following transformation:

$$P_i' = \begin{bmatrix} X_i' \\ Y_i' \end{bmatrix} = \begin{bmatrix} X_i \\ (Y_i + Y_j)/2 \end{bmatrix} \quad (3)$$

$$P_j' = \begin{bmatrix} X_j' \\ Y_j' \end{bmatrix} = \begin{bmatrix} X_j \\ (Y_i + Y_j)/2 \end{bmatrix} = \begin{bmatrix} X_j \\ Y_i' \end{bmatrix}$$

where $P_i' = [X_i', Y_i']^t$ and $P_j' = [X_j', Y_j']^t$ are positions of projected vertices i and j after the correction.

Note that this transformation leads to the smallest change of the two endpoints, in the least sum of squares sense. This corrected image is an orthographic image of a perfectly symmetric shape.

2.3 Producing a Virtual Image

The system then generates a virtual image of the symmetric 3D shape as a function of the corrected image. The virtual image of the symmetric 3D shape is generated by reflecting the corrected image with respect to the y-axis:

$$Q_i' = \begin{bmatrix} -1 & 0 \\ 0 & 1 \end{bmatrix} \cdot P_i' = \begin{bmatrix} -X_i \\ Y_i' \end{bmatrix}, \quad (4)$$

$$Q_j' = \begin{bmatrix} -1 & 0 \\ 0 & 1 \end{bmatrix} \cdot P_j' = \begin{bmatrix} -X_j \\ Y_i' \end{bmatrix}$$

where $Q_i'$ and $Q_j'$ are positions of projected vertices i and j in the virtual image. This virtual image is an image of the same 3D shape after a 3D rigid rotation of the shape around the y-axis. Let the 3D coordinates of the symmetric pair of vertices i and j of the real (corrected) image be $V_i' = [X_i, Y_i', Z_i]^t$ and $V_j' = [X_j, Y_i', Z_j]^t$. Note that x- and y-values of $V_i'$ and $V_j'$ are identical to those of $P_i'$ and $P_j'$ on an orthographic image. In the same way, let the 3D coordinates of the symmetric pair of vertices i and j of the virtual image be $U_i' = [-X_i, Y_i', Z_i]^t$ and $U_j' = [-X_j, Y_i', Z_j]^t$. Then, the vertex that corresponds to $V_i'$ after the 3D rigid rotation can be written as follows:

$$\Lambda_i' = R_{3D} \cdot V_i' \text{ and } \Lambda_i' = U_j' \qquad (5)$$

(5) can be written explicitly as follows:

$$\begin{bmatrix} -X_j \\ Y_i' \\ Z_j \end{bmatrix} = R_{3D} \cdot \begin{bmatrix} X_i \\ Y_i' \\ Z_i \end{bmatrix},$$

where $R_{3D}$ is a 3×3 rotation matrix, and $\Lambda_i'$ is the 3D vertex i after the 3D rigid rotation.

The 3D rigid rotation has three parameters. Recall, however, that $R_{3D}$ in Equation (5) has only one free parameter, the angle $\theta$ of rotation around the y-axis:

$$R_{3D} = R_y(\theta) = \begin{bmatrix} \cos\theta & 0 & \sin\theta \\ 0 & 1 & 0 \\ -\sin\theta & 0 & \cos\theta \end{bmatrix} \qquad (6)$$

2.4 Recovering One-Parameter Family of Symmetric Polyhedra

From the first row of Equation (5) we obtain:

$$-X_j = \begin{bmatrix} \cos\theta \\ \sin\theta \end{bmatrix}^t \cdot \begin{bmatrix} X_i \\ Z_i \end{bmatrix}. \qquad (7)$$

An equation for $Z_i$ can be derived by combining Equation (7) with (2):

$$Z_i = \frac{\cos\phi(x_j + \cos\phi x_i) + \sin\phi(y_j + \cos\phi y_i)}{-\sin\phi}. \qquad (8)$$

Hence, the vertex i of the recovered 3D symmetric shape can be written as follows:

$$V_i' = \begin{bmatrix} X_i \\ Y_i' \\ \frac{\cos\phi(x_j + \cos\phi x_i) + \sin\phi(y_j + \cos\phi y_i)}{-\sin\phi} \end{bmatrix}. \qquad (9)$$

It can be seen that $V_i'$ depends on one parameter, the angle $\theta$.

2.5 Undoing the 2D Correction in 3D Space

If the projected symmetry lines were all parallel in the real 2D image, this step is skipped. If they are not parallel, the recovered 3D shape is distorted so that its image is consistent with the given 2D real image:

$$V_i'' = V_i' + \Delta_{3D}, \qquad (10)$$

where $\Delta_{3D}$ is a 3D distortion and $V_i'$ is position of vertex i after the distortion. Let the 3D coordinate of $\Delta_{3D}$ be $[\Delta_X, \Delta_Y, \Delta_Z]^t$. From Equation (3), $\Delta_{3D} = [0, Y_i - Y_i', \Delta_Z]^t$ and $\Delta_Z$ can be arbitrary. Obviously, this distortion ($\Delta_{3D}$) is minimized when $\Delta_Z = 0$. Hence, the minimally distorted symmetric shape which is consistent with the real 2D image can be written as follows:

$$V_i'' = V_i' + \min(\Delta_{3D}) \qquad (11)$$

$$= \begin{bmatrix} X_i \\ Y_i \\ \frac{\cos\phi(x_j + \cos\theta x_i) + \sin\phi(y_j + \cos\theta y_i)}{-\sin\theta} \end{bmatrix}.$$

Note that the transformation of x and y coordinates in Equation (11) is an inverse transformation of that in Equation (3).

2.6 Applying the Planarity Constraint to Recover Hidden Vertices

Next, system 199 applies a planarity constraint to recover hidden vertices in the 3D shape. Of course, if all vertices are visible in the given 2D image, this step is skipped. System 199 finds symmetric pairs of vertices with exactly one visible vertex and recovers the other vertex in the pair by applying two constraints: a planarity constraint for the visible vertex and a symmetry constraint for the hidden counterpart (see the Section 3, Computational Model for Processing Images of 3D Shapes, for more detail). In order to use a planarity constraint, system 199 first recovers at least three vertices of a face on which the visible vertex is located. Assume then that the face is planar and the orientation of the face is known. The z-value of the visible vertex is obtained by computing an intersection of the face and the projection line emanating from the image of this vertex. The system 199 recovers the hidden counterpart by reflecting the visible vertex with respect to the shape's symmetry plane.

2.7 Applying the Maximum Compactness Constraint

System 199 chooses the recovered shape to be the maximally compact 3D shape from the one-parameter family.

2.8 Adapting the Method for 2D Shapes

Interestingly, this process that was formulated for the case of 3D symmetric shapes can be applied to 2D shapes as well. Specifically, most of the process works the same way in the case of 3D and 2D points simply because it is applied to one pair of symmetric vertices at a time, whether the vertices are in 2-space or 3-space. As a result, system 199 produces a one-parameter family of symmetric shapes and the shapes are either 2D or 3D depending on whether all midpoints of the symmetry line segments are collinear or not. Certain existing systems for recovering 3D symmetric shapes needed either four or three non-coplanar symmetric pairs of vertices. It follows that these prior systems could not recover planar symmetric figures. In the present system, on the other hand, after a one-parameter family of 2D symmetric shapes is computed, the system 199 chooses a symmetric shape that can be produced from the given image by shearing the 2D shape along the projected symmetry line segments.

3. Computational Model for Processing Images of 3D Shapes

The present computational system 199 recovers the 3D shape of an object from a single 2D retinal representation. This system tracks the success human beings experience in shape recovery. This section of the present disclosure provides a detailed description of the computational model applied by system 199, as well as evidence showing that it can recover the 3D shape of complex objects from a wide range of viewing directions. In other words, the evidence shows that this model can achieve a high degree of shape constancy. In many embodiments of this approach, neither a priori learning nor depth perception have a role in machine perception of 3D shape. In these embodiments, once one keeps in mind that (i) the human visual system developed in a 3D environment in which all objects have some volume, and (ii) most naturally occurring objects are approximately symmetrical, one expects that a successful functional visual system would take these facts into account and use them to perceive the shapes of objects as they are in the view. Furthermore, once one adopts this approach in which the volume of an object and its symmetry need not be reconstructed from depth cues, these properties of objects and the shapes of those objects can be recovered by the application of suitable constraints to a single 2D retinal image. This provides marked improvement over some existing technology, which assumed that built-in mechanisms only dealt with the 2D spatial properties of the retinal image, and that the three-dimensionality of objects and the three-dimensionality of the environment itself must be learned and/or reconstructed.

Figure 14B:
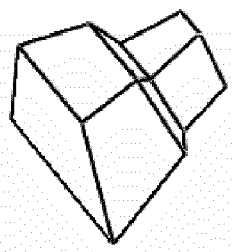
FIG. 14b is a 2D orthographic projection of that 3D object.
Figure 14A:
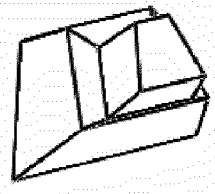
FIG. 14a is a snapshot of a 3D object used in an experimental application of the system described here.
Figure 14C:
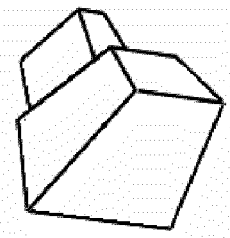
FIG. 14c is a 3D object recovered from the 2D image in FIG. 14b by the system described herein.

The computational model presented herein has the capacity to recover 3D shapes, and that capacity was illustrated in various experiments. One such experiment is illustrated in FIGS. 14a and 14b, which show a 3D original object (as FIG. 14a) and a 2D image of that object (as FIG. 14b). A 3D recovered object (output from system 199) in FIG. 14c is almost identical to the shape of the original object shown in FIG. 14a despite the fact that it is seen from a different viewing direction. Thus the computational model described herein can achieve shape constancy.

Observe that, when one looks at the 2D images in FIGS. 14a and 14b, one perceives it as the same 3D original object viewed from a different direction. This indicates that the visual system is actually recovering a veridical percept of a 3D shape from a single 2D retinal image under these circumstances. This recovery takes place despite the utter absence of depth cues.

The recovered object that system 199 outputs from the input shown in FIG. 14b is shown in FIG. 14c. The model's recovery of the 3D shape in 14c is almost identical to the original object's 3D shape in FIG. 14a. Note that the entire shape was recovered, including the part of the object that was not visible in the 2D image shown in FIG. 14b. In actual demonstrations, the system produced another 2D image of the same object, then recovered another 3D shape from it. Comparing that recovered 3D shape to the recovered 3D shape from the first 2D image, human observers have almost always reported that the shape does not change when it was recovered from a different 2D image of the same 3D object. In other words, the model's shape constancy seems close to perfect.

The computational model in this illustrated embodiment uses an "organized" 2D image of the 3D shape as its input. In other words, figure-ground organization is provided to the model because it cannot establish figure-ground organization by itself. Specifically, system 199 is given information about which: (1) points in the image form edges of the shape, (2) edges and vertices in the same image form contours of faces of the shape, (3) edges and vertices represent symmetric edges and vertices of the shape, and (4) edges and vertices define the volume of the shape.

This information is helpful to provide in the present example embodiment because the a priori constraints that will be applied to our model are shape constraints. They are referred to herein as "symmetry," "planarity," "maximum compactness," and "minimum surface." Symmetry refers to the mirror-symmetry of the object with respect to a plane. Planarity refers to the planarity of the contours of the object. Compactness in this embodiment is defined as $V^2/S^3$, where V is the object's volume and S is the object's surface area. Minimum surface is defined as the minimum of the total surface area. Note that depth cues, including binocular disparity, are not used in the recovery process described in this section. A further technique for using a second image to greatly enhance the 3D shape recovery is described in Section 6.

Also note that the symmetry and planarity constraints have been used before to recover 3D shapes, but use of the maximum compactness and minimum surface constraints is apparently completely new. Maximizing compactness using the exemplary metric mentioned above is equivalent to maximizing the volume of an object while keeping its surface area constant. It is also equivalent to minimizing surface area while keeping the object's volume constant. The minimum surface criterion is equivalent to minimizing the thickness of the object.

To summarize, the present computational model recovers 3D shape by choosing a 3D shape that is as compact and, at the same time, as thin as possible, from the infinitely large family of 3D symmetrical shapes with planar contours consistent with the given 2D shape. In other words, the recovery of 3D shape by the present system 199 is based on a compromise between maximum compactness and minimum surface constraints.

4. Mathematical and Computational Details 4.1 The Application of Mirror Symmetry and Planarity of Contours to Shape Recovery Let the X-axis of the 3D coordinate system be horizontal and orthogonal to the camera's (or eye's) visual axis, the Y-axis be vertical, and the Z-axis coincide with the visual axis. Let the XY plane be the image. Let the set of all possible 3D shapes consistent with a given 2D orthographic retinal image be expressed as follows:

$$\Theta_I = \{p(O) = I\}, \tag{12}$$

where O and I represent the 3D shape and the 2D image, respectively, and p represents an orthographic projection from the 3D shape to the 2D image. (This description uses orthographic images of 3D symmetrical shapes. When perspective images of symmetrical shapes are used, the recovery problem is more constrained, and thus, easier. Specifically, a single perspective image leads to a unique shape recovery. Despite the mathematical uniqueness, constraints will still be needed because recovery is likely to be unstable in the presence of visual noise.) There are infinitely many 3D shapes O that can produce the same 2D image I because translating any point on the surface of a 3D shape along the Z-axis does not change its 2D orthographic image. Consider a subset of $\Theta_I$, in which all 3D shapes are mirror-symmetric and their contours are planar:

$$\Theta_I' = \{O \in \Theta_I : O \text{ is symmetric and its contours are planar}\}. \tag{13}$$

By applying known techniques to this set, symmetry can be used to restrict the family of 3D interpretations of a given 2D image, but the restriction will not typically produce a unique 3D shape. In order to recover a unique 3D shape, additional constraints will be needed. Given a 2D orthographic image $P_{real}$ of a transparent mirror-symmetric 3D shape, and assuming that the correspondences of symmetric points of the 3D shape are known, one can compute a virtual image $P_{virtual}$ of the shape:

$$P_{virtual} = DP_{real}, \tag{14}$$

$$D = \begin{bmatrix} 0 & 0 & -1 & 0 \\ 0 & 0 & 0 & 1 \\ -1 & 0 & 0 & 0 \\ 0 & 1 & 0 & 0 \end{bmatrix}.$$

Under this transformation, for any symmetric pair of points $P_{real} = [X_L \ Y_L \ X_R \ Y_R]^T$ in the 2D real (given) image, their corresponding pair of points in the 2D virtual image is $P_{virtual} = [-X_R \ Y_R - X_L \ Y_L]^T$. The virtual image is another orthographic image that could be produced by the same 3D shape from another viewing direction. FIGS. 3a and 3b show an example of a 2D real and virtual image of a symmetric wire (transparent) shape. The virtual image is usually different from the real image. This is not true in degenerate cases, wherein the 2D real image is itself mirror-symmetric. For a symmetric 2D image, the 2D virtual and the real images are identical (up to a 2D translation) and known methods cannot be applied.

FIGS. 3a and 3b show the real (left) and virtual (right) images of a 3D symmetric shape. Points A, B are images of a symmetric pair of points a, b in the 3D shape. A' and B' are the corresponding points in the virtual image. Note that when the virtual image was produced, A' was obtained (computed) from B. But in the 3D representation, a' is produced after a 3D rigid rotation of a. C, D and E, F are images of other two symmetric pairs of points, c, d and e, f. C', D', E' and F' are the corresponding points in the virtual image. The three open dots in the real image are the midpoints of the three pairs AB, CD, and EF that are images of three pairs ab, cd and ef symmetric points in the 3D shape.

Note that the 2D virtual image is computed directly from the 2D real image without knowledge of the 3D shape itself. This means that the original problem of recovering a 3D shape from a single 2D image is transformed into a problem of recovering a 3D shape from two 2D images, real and virtual. Obviously, using two images leads to a more restricted family of 3D recovered shapes. Next we explain how this 3D shape recovery problem is formulated and solved.

The 2D real image can be considered a 2D orthographic image of the 3D shape at its initial position and orientation. The 2D virtual image is a 2D image of the same 3D shape after a particular 3D rigid movement. This movement in 3D space can be expressed as follows:

$$\vec{v}' = R \cdot \vec{v} + \vec{T}. \tag{15}$$

R is a 3×3 rotation matrix and $\vec{T}$ is a 3×1 translation vector. $\vec{v}'$ and $\vec{v}$ are corresponding points of the 3D shape at two different positions and orientations.

A 3D translation does not affect the shape or size of the 2D image in an orthographic projection. Specifically, translations along the direction orthogonal to the image plane have no effect on the image, and translations parallel to the image plane result in translations of the image. It follows that the 3D translation $\vec{T}$ of the shape can be eliminated by translating the 2D real image or virtual image, or both, so that one pair of the corresponding points in the two images, e.g., A and A' in FIGS. 3a and 3b, coincide. Without restricting generality, let G be the origin of the coordinate system on the image plane and the 3D points a and a' whose images are A and A' coincide with G (it follows that both A and A' also coincide with G). Now, the 2D real image can be considered an orthographic projection of the 3D shape at its original orientation and a 2D virtual image can be considered an orthographic projection of the 3D shape after rotation R of the shape around the origin G. This way, the equation (15) takes the simpler form:

$$\vec{v}'_i = R \cdot \vec{v}_i \tag{16}$$

Where $v_i = [X_i, Y_i, Z_i]^T$, and $v_i' = [X_i', Y_i', Z_i']^T$. Equation (16) can be written as follows:

$$\begin{bmatrix} X_i' \\ Y_i' \\ Z_i' \end{bmatrix} = \begin{bmatrix} r_{11} & r_{12} & r_{13} \\ r_{12} & r_{22} & r_{23} \\ r_{13} & r_{32} & r_{33} \end{bmatrix} \begin{bmatrix} X_i \\ Y_i \\ Z_i \end{bmatrix} \tag{17}$$

Consider the first two elements of the column vector $v_i'$:

$$\begin{bmatrix} X_i' \\ Y_i' \end{bmatrix} = \begin{bmatrix} r_{11} & r_{12} \\ r_{21} & r_{22} \end{bmatrix} \begin{bmatrix} X_i \\ Y_i \end{bmatrix} + \begin{bmatrix} r_{13} \\ r_{23} \end{bmatrix} Z_i. \tag{18}$$

In equation (18), the points $[X_i \ Y_i]^T$ and $[X_i' \ Y_i']^T$ in 2D real and virtual images are known. The following relation is known between $[X_i \ Y_i]^T$, $[X_i' Y_i']^T$ and R:

$$r_{23} X_i' - r_{13} Y_i' + r_{32} X_i - r_{31} Y_i = 0. \tag{19}$$

Let's put the four elements of the rotation matrix R, which appear in equation (19), in a vector $[r_{23} \ r_{13} \ r_{32} \ r_{31}]^T$. The direction of this vector can be computed by applying equation (19) to the three pairs of corresponding points in the 2D real and virtual images (e.g., BDF and B'D'F'). The length of this vector can be derived from the constraint that the rotation matrix is orthonormal:

$$r_{13}^2 + r_{23}^2 = r_{31}^2 + r_{32}^2 = 1 - r_{33}^2. \tag{20}$$

Thus, if $r_{33}$ is given, $[r_{23} \ r_{13} \ r_{32} \ r_{31}]^T$ can be computed from two 2D images of three pairs of symmetric points. The remaining elements of the rotation matrix can be computed from the orthonormality of R. It follows that two orthographic images (real and virtual) determine R up to one parameter $r_{33}$ that remains unknown. Note that once the rotation matrix R is known, the 3D shape can be computed using equation (18). This is accomplished by computing the unknown values of the Z coordinate for each image point $(X_i \ Y_i)$. Thus, $r_{33}$ completely characterizes the family of 3D symmetric shapes that are consistent with (recovered from) the given image. Usually for each value of $r_{33}$, two different rotation matrices are produced because if $[r_{23} \ r_{13} \ r_{32} \ r_{31}]^T$ is the solution, $[-r_{23} \ -r_{13} \ -r_{32} \ -r_{31}]^T$ is also a solution. Consequently, two 3D shapes are recovered for each value of $r_{33}$, and these two shapes are related to one another by depth-reversal.

To summarize, the one-parameter family of 3D symmetric shapes can be determined from four points (A, B, D and F) in the 2D real image and the corresponding four points (A', B', D' and F') in the 2D virtual image. Recall that the virtual points A', B', D' and F' have been computed from the real points B, A, C and E. It follows that the recovery is based on six points A, B, C, D, E and F in the real image that were produced by three pairs of symmetric points a, b; c, d; and e, f in the 3D shape. One real and its corresponding virtual point (here A and A') are used to undo the 2D translation. The other three real points (B, D, F) and their corresponding virtual points B', D', F') are used to compute the rotation matrix (R). Note that the six points a, b, c, d, e and f cannot be coplanar in the 3D shape. To guarantee that these six points forming three pairs of symmetric points are not coplanar in the 3D, one only needs to verify that the midpoints ($u_1 \ u_2 \ u_3$) of the orthographic images of these three pairs of points (the midpoints are marked in blue in the real image in FIGS. 3a and 3b) are not collinear:

$$\|(u_1 - u_2) \times (u_1 - u_3)\| \neq 0. \tag{21}$$

In some cases, these three symmetric pairs are not coplanar in 3D, but their midpoints in the image are collinear. This happens when the viewing direction is parallel to the plane of symmetry of the 3D shape. In such a case, the 3D shape is symmetric with respect to the YZ plane, and its 2D image is, itself, symmetric. When this happens, all midpoints of the images of symmetric pairs of points are on the y axis. As a result, the real image and virtual image are identical, and the 3D shape cannot be recovered. So the fact that midpoints in the real and virtual images are not collinear implies that the 3D midpoints are not coplanar and the viewing direction is not parallel to the plane of symmetry of the 3D shape.

Note that there is another degenerate case that precludes recovery. This occurs when the viewing direction is orthogonal to the plane of symmetry of the 3D shape. In this case, each pair of 3D symmetric points projects to one 2D point and there is not enough information in the image to perform 3D recovery. Specifically, both $r_{13}$ and $r_{23}$ are zero, and the Z-coordinates in equation (18) cannot be computed.

Next it will be shown how a known method can be generalized to the shapes of opaque objects before ways of determining the value of $r_{33}$ are discussed. This will be illustrated in particular for the case of polyhedra. Shapes of opaque objects are more difficult to recover because images of such objects provide less information. In extreme cases, information about some parts of a 3D shape may be completely missing from the 2D image, which implies (trivially) that the 3D shape cannot be fully recovered. We restrict discussion to those 2D retinal images that allow full recovery of the 3D shape of an opaque object. How this was done is described next.

As shown above, in order to compute the rotation matrix R, at least three pairs of symmetric vertices of a polyhedron must be visible. Once R is computed, all symmetric pairs whose vertices are both visible can be recovered from Equation (18); e.g., the 3D vertices g, h; m, n; and p, q in FIGS. 4a and 4b. These two steps are identical to those described above for transparent objects. In the case of the image in FIG. 4, there are a total of six pairs of such vertices (the filled circles in FIGS. 4a and 4b). Recovery fails if both vertices in a symmetric pair are invisible. The reason for the failure is that if both $[X_i Y_i]^T$ and $[X_i' Y_i']^T$ are unknown, $Z_i$ cannot be computed. For pairs of symmetric vertices with one vertex visible and the other occluded, for example, the symmetric pair u and w in FIGS. 4a and 4b, a planarity constraint can be applied. In this case, symmetry in conjunction with planarity of the contours of faces is sufficient to compute the coordinates of both of these vertices. For example, the planarity of the face gmpu implies that u is on the plane s determined by g, m and p. The vertex u is recovered as an intersection of the face s and the line $[u_x u_y 0]^T + \lambda[0\ 0\ 1]$. The hidden counterpart w of u is recovered by reflecting (u) with respect to the symmetry plane of the 3D shape. The symmetry plane is determined by the midpoints of the three recovered pairs. FIGS. 4a and 4b show a real and a virtual image of an opaque polyhedron that can be recovered completely; that is, both the visible front part and the invisible back part can be recovered. On average, about 60% of the 2D images investigated allowed a full recovery of the 3D shapes with the randomly generated polyhedra that were used and with randomly generated 3D viewing orientations. Interestingly, once the recovery of an opaque object is possible, the recovery is unique for a given value of $r_{33}$; the depth-reversed version of the 3D shape is excluded by the constraint that the invisible vertex must be behind its visible symmetric counterpart. Recall that for transparent (wire) shapes, there are always two 3D shapes related to one another by depth reversal. So, paradoxically, opaque shapes, which provide less information in the image, are less ambiguous.

FIGS. 4a and 4b are a real (left) and a virtual (right) image of a 3D symmetric opaque polyhedron. Points G, H, M, N, P, Q and U are images of the 3D vertices g, h, m, n, p, q and u, respectively. The symmetric pairs gh, mn, pq can be reconstructed from equation (18) once the rotation matrix R is known since both points of these pairs are visible. There are six pairs of such vertices. These pairs are marked by solid dots. The vertex u, which resides on the plane determined by vertices g, m, and p, is reconstructed from the planarity constraint. The invisible symmetric counterpart w of vertex u is obtained by reflecting u with respect to the symmetry plane. There are two such vertices, whose reconstruction used both symmetry and planarity constraint. These vertices are marked by open dots.

Up to this point, it has been described how the one-parameter family $\Theta_I'$ of 3D shapes is determined. This family is characterized by $r_{33}$. For each value of $r_{33}$, one, or at most two, shapes are recovered. All 3D shapes from this family project to the same 2D image (the real image). All of them are symmetric and the contours are planar. Because $r_{33}$ is an element of a rotation matrix, it is bounded:

$$\Theta_I' = \{O = g_I(r_{33}) : -1 \leq r_{33} \leq 1\}. \quad (22)$$

Next, we describe two shape constraints, called "maximum compactness" and "minimum surface" that are used to determine the value of the unknown parameter $r_{33}$. These constraints are new; to the author's knowledge, they have never been used to model 3D shape recovery.

4.2 The Application of the Maximum Compactness Constraints

A 3D compactness C of shape O is defined as follows:

$$C(O) = \frac{V(O)^2}{S(O)^3}, \quad (23)$$

where V(O) and S(O) are the volume and surface area of the shape O, respectively. Note that compactness is unit-free, and, thus independent of the size of O. Its value depends only on shape. Applying the maximum compactness constraint recovers a unique 3D shape. Specifically, selecting the maximally compact 3D shape from the one-parameter family of 3D shapes recovered by the method based on known methods leads to a unique 3D shape. While no proof is presented here of the claim that the result of this recovery is always unique, the result was always unique over simulations with several thousands of 3D shapes.

Maximizing C(O) corresponds to maximizing the volume of O for a given surface area, or minimizing surface area of O for a given volume. Compactness defined in equation (23) is a 3D version of the 2D compactness constraint used in the past for the reconstruction of surfaces. The 2D compactness of a closed contour is defined as a ratio of the surface's area enclosed by the contour to the perimeter, squared. The circle has maximal compactness in the family of 2D shapes. The sphere has maximal compactness in the family of 3D shapes. Recall that the Gestalt psychologists considered the circle and the sphere to be the simplest, and therefore, the "best" shapes. They were the simplest because they were the most symmetric of all shapes. Historically, the relation between symmetry and compactness was established formally by the Steiner symmetrization operation.

Note that maximum 3D compactness is a generalization of the minimum variance of angles constraint used previously to recover the shapes of polyhedra. The maximum compactness constraint, like the minimum variance of angles constraint, "gives" the 3D object its volume. The minimum variance of angles constraint is very limited, it only applies to polyhedra.

The maximum compactness is much less confined. It can be applied to almost any 3D shape.

4.3 Application of the Minimum Surface Constraint

This constraint is quite straightforward. It chooses the 3D object whose total surface area S(O) is minimal. In other words, the model maximizes the expression 1/S(O). If there were no other constraint, the resulting 3D object would be flat—it would have no volume. Recall, however, that this constraint will always be applied to objects that have some volume. This means that the minimum surface constraint will produce the thinnest possible object, the object with the smallest range in depth. We already know that maximizing compactness is useful. Why is making an object as thin as possible, less than maximally compact, useful? It is useful because it will allow the veridical recovery of shapes, they way they are "out there." Said technically, recovering a 3D shape that has the smallest range in depth is desirable because it minimizes the sensitivity of the 2D image to rotations of the 3D shape. This makes the 3D recovered shape most likely. Combining a maximum compactness with a minimum surface constraint will lead to very good recovery of 3D shapes.

How should these two constraints be combined? Various embodiments of the present system and method will work, such as:

$$V(O)/S(O)^3 \qquad (24)$$

That is, this model recovers the 3D shape that maximizes the ratio defined in (13). Note that this ratio is the geometric mean of $V^2/S^3$ (compactness) and $1/S^3$ (minimum surface).

4.4 Robustness in the Presence of Image Noise

The model described above assumes that the retinal (or camera) image has no noise, but real images always contain some noise. How can such image-noise be handled? This becomes an important question as soon as one wants the model to recover the 3D shapes of real objects in real environments from real 2D images. Noise is handled in various embodiments at three different stages of the model. First, it can be verified whether pairs of points that are known to be symmetric form a set of parallel line segments in the image. In the absence of noise, the line segments must be parallel because the parallelism of these lines is invariant in an orthographic projection. If they are not parallel because of noise and/or because of uncertainty in the figure-ground organization, their positions can be changed to make these line segments parallel. Obviously there will always be some ambiguity about how this change should be made, but it should be possible to do so. For example, a natural constraint that removes such ambiguity is to minimize the sum of squared distances that represent the change of the positions of the points. In other words, the points should be moved as little as possible to satisfy the parallelism constraint. An alternative way to make the line segments connecting pairs of symmetric points parallel is to apply a least-squares approximation when the one-parameter family of 3D symmetrical shapes is produced. Note that a least-squares correction that makes the line segments parallel will not ensure the planarity of the faces of the 3D polyhedron. Planarity can also be restored at the very end of the recovery by adjusting the depths of individual points. Preliminary tests of these three methods for correcting noise were performed with synthetic images, and it was found that this 3D shape recovery model was quite robust.

4.5 Testing the Model

This section describes a simulation experiment that tested the model's capacity to recover 3D shape from a single, randomly chosen 2D image. Current opinion holds that no existing machine vision system can "see" shapes as well as humans do. Furthermore, most published studies of human shape perception concluded either that humans do not achieve shape constancy, or that their shape constancy is far from perfect. It follows from these current commonly held claims that a computational model of 3D shape recovery either would not demonstrate shape constancy, or that shape constancy would be poor if it were manifested at all. Those who have used the working demonstration of this model, however, have reported that neither of those contentions is true. The next section describes a formal evaluation of the model that confirms the participants' compelling, informal, subjective observations.

Stimuli 2D images (line drawings) of randomly generated 3D abstract shapes like those shown in FIGS. 4a and 4b were used as stimuli. Abstract shapes, rather than shapes of common objects, like chairs, couches or animal bodies, were used to facilitate comparison of this system's performance with the performance of human observers. Human observers were tested with abstract shapes to avoid familiarity confounds. The present model, which has no provision for "learning," is obviously not subject to this problem. To the model all stimuli are novel, including those familiar to humans. Common objects could be used with the model, but this would make it impossible to compare humans' performance and the model's performance. The shapes were 2D orthographic images of opaque 3D symmetric polyhedra (hidden edges were removed). Only images allowing complete recovery of each 3D opaque polyhedron, were used. Sixty percent of the 2D images, produced from randomly generated viewing directions, satisfied this requirement.

Each polyhedron had 16 vertices. Their positions were randomly generated in 3D space with the following constraints: (i) the object had planar faces, (ii) it had one plane of symmetry, (iii) the "front" part of the object was a box smaller than the box in the "back", and (iv) these boxes had a pair of coplanar faces. The simulation used 100 randomly generated polyhedra whose aspect ratios varied between 1/5 and 5. For each polyhedron, a randomly chosen viewing orientation was used, and its orthographic image was computed. Viewing orientation was random subject to one constraint, namely the slant of the plane of symmetry of the 3D object had one of the following five values: 15, 30, 45, 60 and 75 deg. Each slant was used 20 times for a total of 100 images. The value of slant was controlled to allow the model's shape constancy to be evaluated.

Analysis

A quantitative measure of 3D shape was needed to compare the recovered 3D shape with the original 3D shape. In order to derive this measure, we first established the number of parameters that were required to characterize both the original and recovered shapes. The shape of each original polyhedron was determined by 16 vertices, each vertex having three coordinates. Only half of the vertices were needed because the polyhedron was mirror-symmetric. This leads to 24 parameters (8×3). The other half of the object required three parameters to specify the symmetry plane. But, since 3D position, orientation and size do not affect 3D shape, the 3D shape of the original polyhedron was characterized by only 20 parameters (24+3−7). The actual number of parameters for all original polyhedra was smaller (15) because of the planarity constraint. Now, consider the 3D shape of the recovered polyhedron. This polyhedron was also characterized by 15 parameters because it had the same overall 3D structure. Recall that the recovered 3D shape was obtained from a 2D image that was produced by the original 3D shape. It follows that the original and recovered shapes differ with respect to only one parameter, $r_{33}$. Thus, the 3D shapes, representing the original polyhedron and the recovered polyhedron, can be compared simply. Only one parameter, $r_{33}$, is needed. But note that this parameter is not ideal because it is abstract; it is an element of a 3D matrix used for computations in the model. Unfortunately, no intuitive interpretation of this parameter is available, one that would refer directly to the 3D shape perceived. Fortunately, there is a perceptually relevant parameter that can be used in place of $r_{33}$, namely, one of the three aspect ratios of the polyhedron. Specifically the ratio of its thickness measured in two orthogonal directions. The "thickness" of a shape along the direction $\vec{n}$ is defined as the maximum difference among all vertices along the direction $\vec{n}$:

$$T_I^{\vec{n}}(O) = \max(\vec{v}_i \cdot \vec{n}) - \min(\vec{v}_i \cdot \vec{n}) \, i = 1, 2, \ldots n,$$

where $\vec{v}_i$ is a 3D vertex and n is the number of vertices. The aspect ratio $Q_I(O)$ is defined as the ratio of thicknesses along two directions: one is parallel to the normal of the symmetry plane $\vec{n}_s$ and the other is parallel to the normal of the base face $\vec{n}_b$ (see FIG. 5).

$$Q_I(O) = \frac{T_I^{\vec{n}_s}(O)}{T_I^{\vec{n}_b}(O)}. \quad (25)$$

This ratio specifies the 3D shapes of our polyhedra uniquely.

FIG. 5 is an illustration of how two directions were used to compute a shape's aspect ratio. The aspect ratio for each shape (from left to right) is: 1/3, 1 and 3.

Once we know how to measure the original and the recovered 3D shapes, we need a way to compare them. In some embodiments, the comparison is done by way of a "similarity" metric. More exactly, the following formula measures the "dissimilarity" $L_I$ between shapes $O_1$ and $O_2$:

$$L_I(O_1, O_2) = \begin{cases} \frac{Q_I(O_1)}{Q_I(O_2)} & \text{if } Q_I(O_1) > Q_I(O_2) \\ 1 & \text{if } Q_I(O_1) = Q_I(O_2) \, O_1, O_2 \in \Theta'_I \\ \frac{Q_I(O_2)}{Q_I(O_1)} & \text{if } Q_I(O_1) < Q_I(O_2). \end{cases} \quad (26)$$

The dissimilarity is simply a ratio of aspect ratios of two shapes, computed in such a way that the result is never less than one. So, if an aspect ratio of the first shape is 2 and that of the second is 1/2, their dissimilarity is 4. The dissimilarity is also 4 when the aspect ratio of the first shape is 1/2 and that of the second shape is 2. When $L_I(O_1, O_2)$ is equal to one, the two shapes $O_1$ and $O_2$ are identical.

Results

FIG. 6 shows a scatter plot of the relation between the aspect ratio of the original 3D shape and the aspect ratio recovered by our model. Different colors represent different values of slant. Two facts stand out in this graph. First, the data points representing individual slant-values form a set of approximately straight lines. This means that there was a high correlation between the recovered and original aspect ratio for the individual slant-values. The correlation coefficients range between 0.92 and 0.97. Second, these straight lines do not coincide. They are shifted relative to one another and stay approximately parallel to the diagonal line. In particular, the data points for slants 30, 45 and 60 degrees are close to the diagonal line, the line representing veridical recovery of the aspect ratio. Note however, that the data points for the extreme slant-values, 15 and 75 degrees, are farther from the diagonal line, indicating that there were systematic errors in the recovered aspect ratio. When these extreme slant-values are included, the overall correlation coefficient of the recovered and original aspect ratios is much lower, namely 0.61.

FIG. 6 shows the aspect ratio of the original 3D shape on the ordinate, and shows the aspect ratio recovered by the model on the abscissa. Colors represent slants of the plane of symmetry: blue 15 degrees; green, 30 degrees; red, 45 degrees; cyan, 60 degrees; and pink, 75 degrees.

Figure 7:
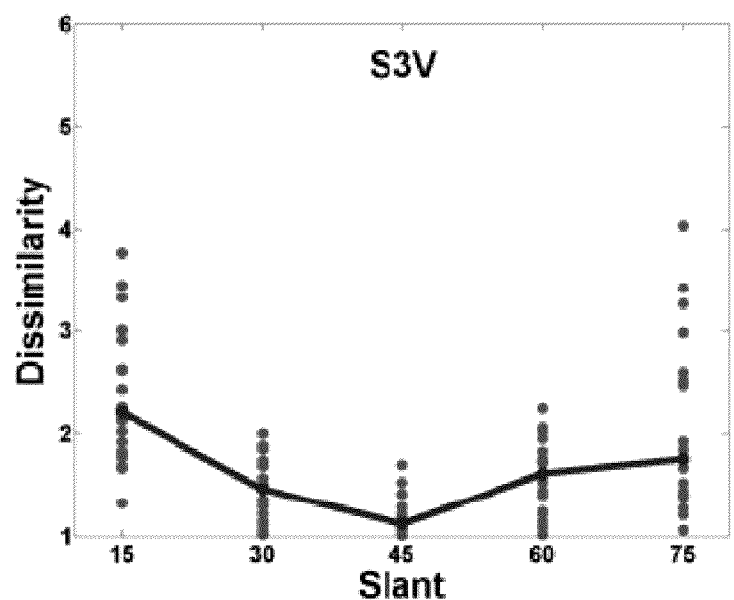
FIG. 7 is a scatter plot of the relation between the aspect ratio of the recovered object and the original aspect ratio for various slants of the plane of symmetry of the original object.

The effect of the slant of the plane of symmetry on the systematic error of the recovered aspect ratio is illustrated more clearly in FIG. 7. The ordinate shows "dissimilarity" between the recovered and original shapes as defined in equation (26). Recall that dissimilarity equal to one means that the recovered aspect ratio is equal to the original aspect ratio, and that dissimilarity equal to two means that the recovered and original aspect ratios are different by a factor of two. The data points represent individual shapes (there were 20 points for each slant). The continuous line represents the median dissimilarity. The errors were usually small for slant-values 30, 45 and 60 deg. For the extreme slants, 15 and 75 deg, the errors tended to be larger. However, the overall median dissimilarity across all slants was 1.4, which means that for half of the recovered shapes, the errors in the aspect ratio were not larger than 40%. Large errors occur when the 3D object looks like a long rod with its long axis close to the viewing axis. In such cases, the 2D image is compact, and, as a result, the recovered 3D shape is less elongated than the original shape. The same was true when a human observer, rather than a model, recovered the 3D shapes. Note that the model only made errors in one of the 15 parameters that characterize the 3D shape. This allows one to say that the 3D shape recovered by the model is always quite accurate even when there are errors in the aspect ratios recovered.

Why does the model make any errors at all when it recovers 3D shapes? The answer is simple. A single 2D orthographic image of a 3D shape with a single plane of symmetry can never be sufficient for completely error-free recovery of this shape. This is why our model needed more than two, already known, useful constraints, namely, symmetry and planarity. Our additional constraints, maximum compactness and minimum surface area, achieved a great deal. They made it possible to recover the 3D shapes quite well. The more interesting question is why is the model performing so well? Apparently, 3D maximum compactness and minimum surface capture a significant aspect of the relation between 3D shapes and their 2D perspective images. Namely, compact 3D shapes never produce non-compact 2D perspective images. For example, a cube always produces a compact 2D perspective image regardless of the viewing direction. (This is true in the case of a perspective projection to a spherical retina, like the retina in the human eye. When the "retina" is planar, like those in convention cameras, this statement applies when the image is only projected to the center of the retina.) Conversely, non-compact 3D shapes rarely produce compact 2D perspective images. For example, a long rod "out there" rarely produces very short rod in the 2D image. The important point to remember is that the recovery of the aspect ratio is quite accurate for a wide range of compactness and for a wide range of viewing directions. Even more important, the model's recovery of the 3D shape, itself, was very accurate: It made errors with only one of the 15 parameters used to characterize the 3D shape!

4.6 Human Observers' Ability to Adjust Aspect Ratios

Our model was tested by examining its recovery of the aspect ratios and it was found to do so very well. The question now arose whether the human observers can do this too.

Method

Two of the inventors and two naïve observers participated in this experiment. All of them had normal or corrected-to-normal vision. Each observer was tested with the same 100 images that were used to test the model. The stimulus subtended 5.7 deg (5×5 cm at the 50 cm viewing distance).

The room was dark and the head was supported by a chin-forehead rest. The observer viewed the stimulus with the preferred eye. In each trial, a 2D orthographic image of a randomly generated symmetrical polyhedron was shown for 5 s near the top of a computer screen. This 2D image led to the percept of a 3D shape. The observer was asked to remember this 3D shape. Then, the 2D image disappeared and a rotating 3D polyhedron was shown in the middle of the screen. This rotating polyhedron was selected from the set of symmetrical 3D polyhedral shapes with planar contours generated by our model from the 2D image that was shown first. In other words, the 2D orthographic image was the image of the 3D rotating polyhedron. This 3D polyhedron was rotating in a random direction at about 90 degrees/second. This allowed many different views of the 3D shape to be seen in a short amount of time. The observer could use a mouse to adjust the aspect ratio of the 3D shape to make it match the percept of the 3D shape produced by the stationary 2D image shown at the beginning of the trial. Each trial began with the aspect ratio set to a random value. There was no time limit for the adjustment.

Results

Figure 8:
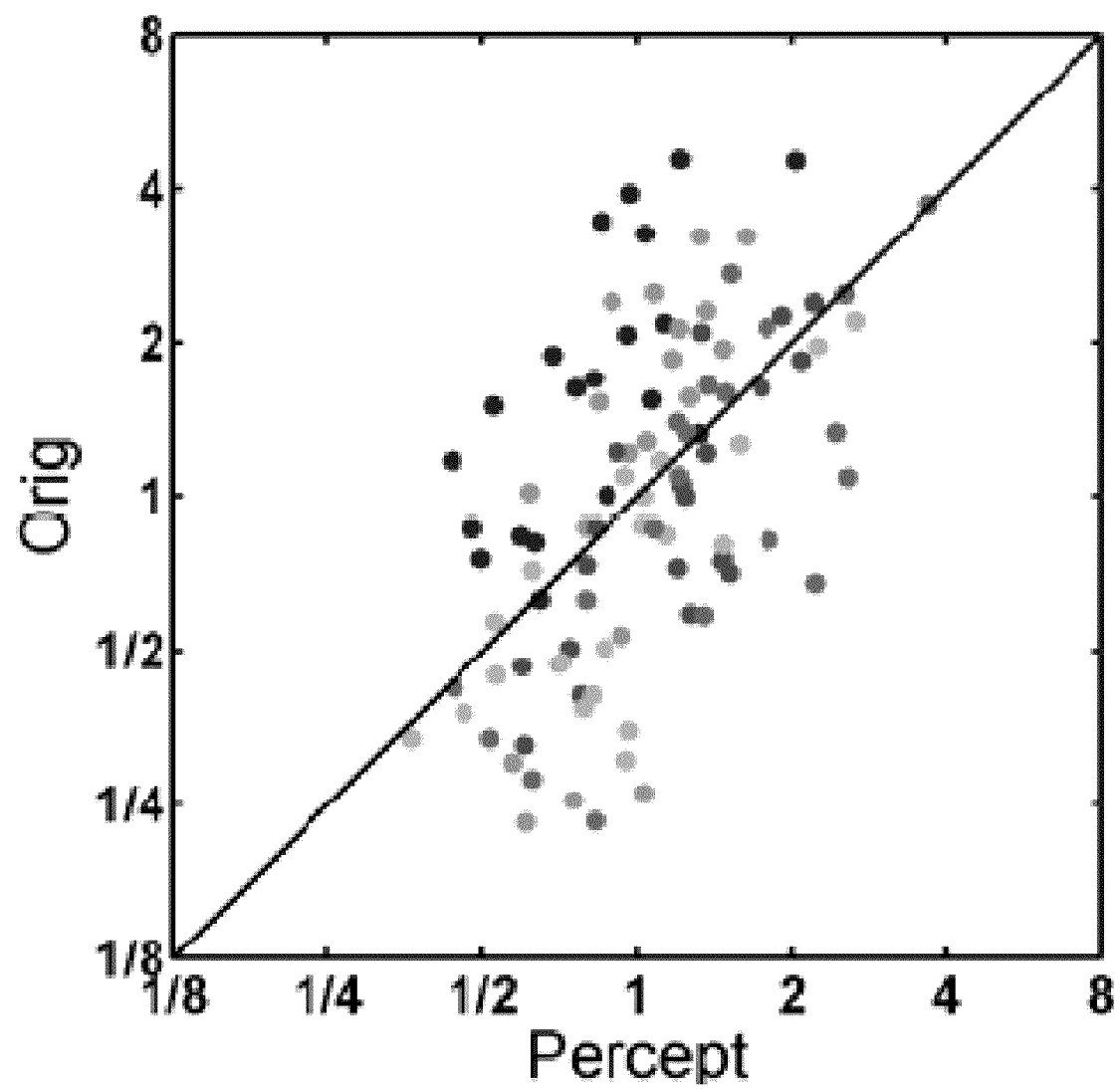
FIG. 8 is a scatter plot illustrating the relation between the aspect ratio of the original 3D shape and the aspect ratio recovered by one observer.

FIG. 8 shows a scatter plot illustrating the relation between the aspect ratio of the original 3D shape and the aspect ratio recovered by one naïve observer (results of the other three observers were very similar). The same symbols are used as in FIG. 6. This scatter plot is quite similar to the scatter plot of the model shown in FIG. 6. Specifically, for each individual slant value there was a high correlation between the original aspect ratio and the aspect ratio recovered by the subject (the correlations ranged between 0.70 and 0.79). Second, there is a systematic effect of slant on the recovered aspect ratio. These two observations suggest that the observer's percept would be similar to the model's if the model could "perceive."

Figure 9:
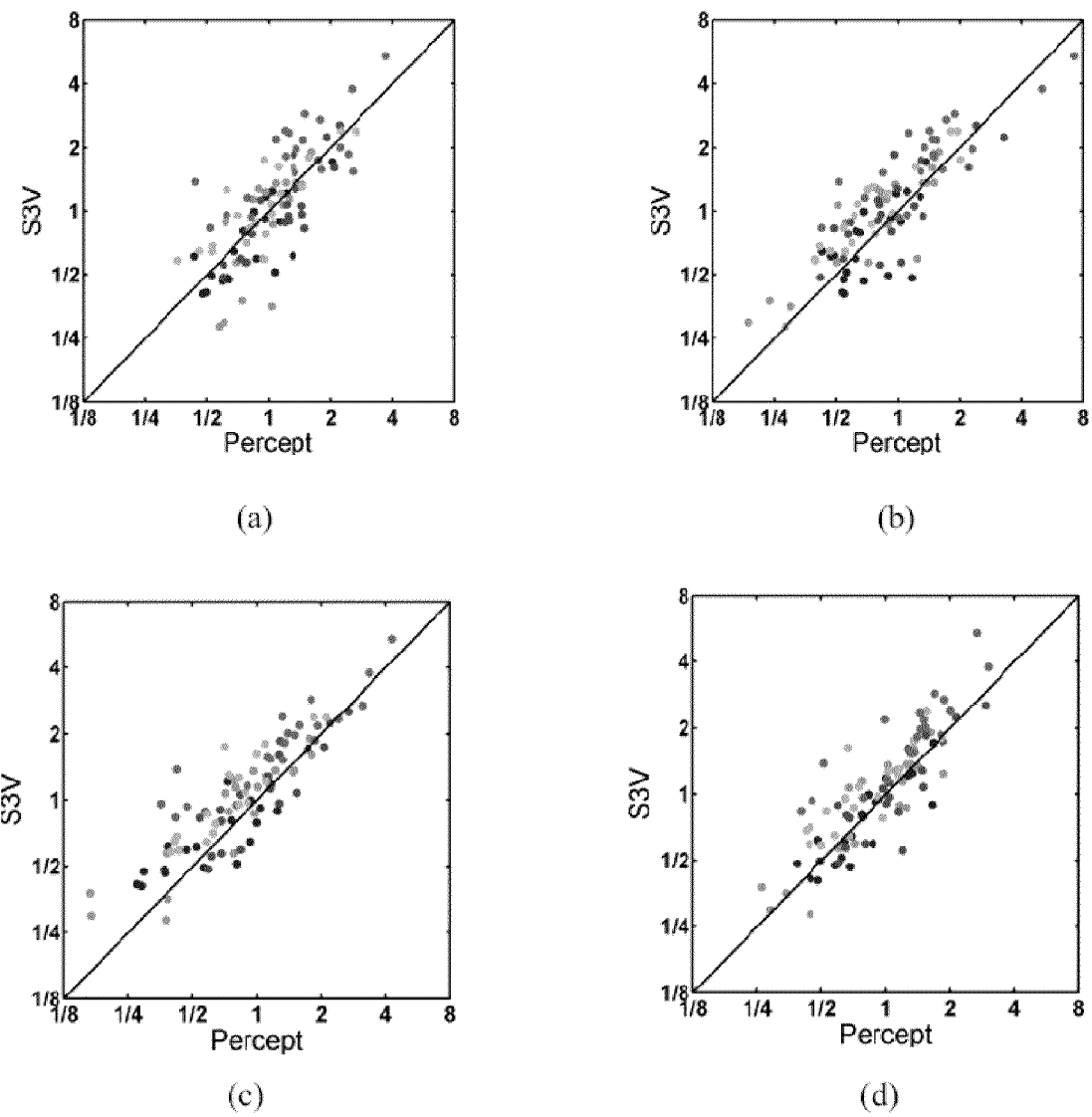
FIG. 9 is a collection of scatter plots of the aspect ratio recovered by the model and that recovered by four experimental observers.

The scatter plots of all four subjects are shown in FIG. 9 to facilitate evaluating more directly the relation between the aspect ratio recovered by the model and that recovered by the observers. This figure shows the aspect ratio of the 3D shape recovered by the model on the ordinate, and the aspect ratio recovered by the subject on the abscissa: (a) ED, (b) TJ, (c) YL, and (d) ZP. The same symbols are used as in FIG. 6. These graphs show a strong relation between the model's and the observer's recovery: the correlations shown in these four scatter plots range between 0.76 and 0.87. The correlations between the model's and observer's aspect ratios are very similar to the correlations between the aspect ratios recovered by any two of the observers (these inter-subject correlations range between 0.74 and 0.88). This means that the model can account for an observer's results equally well as one observer can account for the results of another observer. In other words, the model can "explain" the observer's percept quite well, and it can do this not only when percepts are veridical, but also when the percept was very different from the aspect ratio of the original shape. Large differences between the aspect ratios recovered by the model and by the observers were very rare. They almost never differed by more than a factor of two, and the median difference between the model and the observer was equal to a factor of about 1.25 (i.e., 25% difference in the recovered aspect ratio). These results are believed to be the very first demonstration in which a computational model performed as well as a human observer in a 3D shape perception task.

Figure 10:
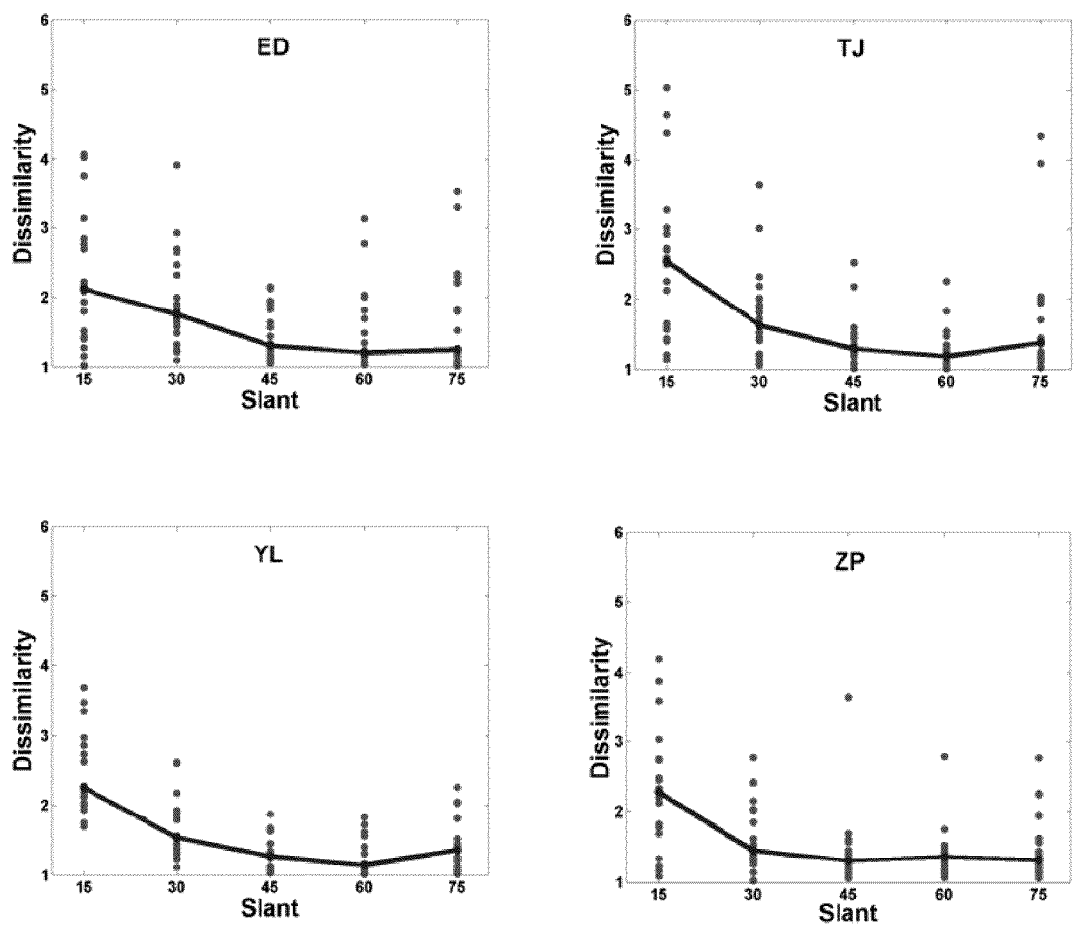
FIG. 10 is a collection of scatter plots of the relation between the aspect ratio of the recovered object and the original aspect ratio for various slants of the plane of symmetry of the original object, as recovered by the four experimental observers.

Finally, the effect of slant on the errors in the recovered aspect ratio was evaluated (see FIG. 10). These relations were similar to one another, which means that the recovery produced by all four observers—both investigators and naïve observers—were similar. Familiarity with the stimuli and with existing theories of shape perception did not affect their performance at all. Note that the relations shown in FIG. 10 are somewhat different from those shown in FIG. 7. Specifically, the observers' median dissimilarity for slants 60 and 75 degrees was smaller than the model's. Simulations were performed and showed that the model's performance with these two slants can match the performance of the observers' when maximum compactness (Equation 23) is used to recover the 3D shape. This is important because the results reported here suggest that the observers used one constraint, namely the maximum of $V/S^3$ (Equation 24), for slants 15, 30 and 45 degrees, and another constraint, namely the maximum of $V^2/S^3$ (Equation 23), for slants 60 and 75 degrees. In other words, the human visual system "switched" from using one constraint to the other, depending on the slant of the symmetry plane of the 3D shape. In our experiment, making such a switch would require detecting cases in which the slant of the symmetry plane was close to 90 degrees. It is not difficult to imagine how such a detection might be done despite that fact the a formal model has not yet been developed that makes such a detection. This detection would require nothing more than detecting whether the 2D image of a 3D symmetrical shape is nearly symmetrical.

5 Summary of Single-Image Shape Recovery

5.1 Shape Constancy with Real Images

Now that it has been illustrated that the model can recover 3D shapes from 2D synthetic images of abstract and unfamiliar 3D shapes, one might consider whether the model can recover 3D shapes equally well from real 2D images of real objects in natural environments. It probably will, simply because most objects "out there" are at least approximately symmetrical. Asymmetrical objects with no planar contours and without clearly defined volume are very rare. Common objects such as animals, buildings, and sofas are almost always symmetrical and they almost always have contours that are approximately planar. They also almost always have surfaces enclosing volume. Chairs and tables have little volume that actually "belongs" to these objects, but it is easy to "see" the surfaces and volume defined by the legs of chairs and tables. The only objects that do not have any of the three properties that have been used in prior studies on shape perception are crumpled pieces of papers and 3D wire objects. Not surprisingly, shape constancy is difficult, if possible at all, to achieve with these objects. They do not have properties that can be processed by our model that uses symmetry, planarity and maximum compactness constraints. They also cannot be processed well, if at all, by human observers.

5.2 Shape Constraints Vs. Canonical Views

The present results show that views close to what are called "degenerate" or "nearly degenerate" views, lead to 3D recovered shapes whose aspect ratio might be very different from the aspect ratio of the 3D original shape that produced the 2D image. This fact, and what are sometimes called "canonical views," deal with an important issue in shape perception. Namely, it recognizes that not all views of a 3D shape are equally informative. Previous authors introduced the concept of canonical views (or canonical perspective) assuming that 3D shape perception is based on 2D representations of 3D shapes. The 2D representations (views) are memorized by the observer and subsequently used to recognize 3D shapes. This kind of theory assumed that there are only few representative 2D views that can be used to establish the shape through learning. It also assumed that one perspective image called "canonical" is prototypical, the best representative of the object's shape. These assumptions are incorporated into theories like this because the observer will not be required to memorize very many 2D views before he can recognize the 3D object on the basis of a remembered canonical shape. The present system is built upon a different set of assumptions, namely, that the perception of a 3D shape reflects the operation of shape constraints that recover the 3D shape from one of its 2D retinal images. These constraints are built into the organism. There is no need to store canonical views or to learn anything. Most views of most 3D objects provide enough information to recover the object's 3D shape from its 2D retinal image.

5.3 The Role of Depth Cues in Shape Perception

Figure 11:
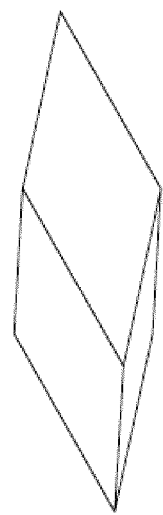
FIG. 11 is an orthographic view of a highly non-compact object from a viewing direction nearly parallel to the long axis of the object.

What, if any, is the role of cues to depth and surface orientation, such as binocular disparity, motion, shading or texture, in the recovery of 3D shape and shape constancy? Note that here "3D shape" refers to the spatially global properties of objects. Depth cues are quite different. They are spatially local in the sense that they provide information about the distance of a given point or feature from the observer or about the local orientation and curvature of the surface of an object. If depth cues are to be used in shape perception, they will have to provide multiple perceptual measurements at many points on the 3D object, and the measurements from these multiple points must then be integrated if they are going to be used to perceive a 3D shape. How good could such an integration be? In the absence of constraints (priors) for the relations among the points across spatially separated parts of the 3D object, the individual perceptual measurements are likely to be statistically independent. It follows that the integration of depths and surface orientations across multiple points of the object is likely to be less reliable than the percept of depth or surface orientation at a single point of the object. It is known that percepts of 3D distances, angles and aspect ratios are quite unreliable (difference thresholds are large and subject to large systematic errors). It follows that depth cues, alone, cannot lead to reliable percept of a 3D shape. For example, if an observer tried to recover 3D symmetry from depth cues, the resulting percept would be quite unreliable, and therefore, not actually symmetric, unless the symmetry were used as an a priori constraint. But if symmetry were used as such a constraint, depth cues would be superfluous. They are not needed! In such a system, depth cues could be of some use in the correction of the recovered aspect ratio of a 3D shape. Recall that both the model and the observers sometimes made large errors in recovering an aspect ratio, especially when the object was highly non-compact and the viewing direction was nearly parallel to the long axis of the object (an example of such an object is shown in FIG. 11). In such cases, employing the maximal compactness and minimal surface area constraints will lead to a 3D shape that has substantially less depth than the original shape. This kind of error could probably be corrected by using binocular disparity or motion parallax. Some informal observations confirm this prediction. Specifically, binocular viewing of a 3D shape like the one shown in FIG. 11, when the viewing axis is parallel to the long axis of this shape, leads to more a veridical percept than monocular viewing.

6 Applying Binocular Disparity

In some embodiments, the concept of binocular disparity is applied to 3D shape perception in an interesting way. In particular, the system overcomes three well-established, but surprising facts about binocular vision. First, perceived depth is systematically distorted, viz., depths smaller than one meter are overestimated, while depths greater than one meter are underestimated. Second, perceived shapes of objects are systematically distorted. Third, the perceived distortions of 3D shape can be predicted from the perceived distortions of depth. According to these facts, nearby objects (within 1 m) will be perceived as stretched in depth, and farther objects (beyond 1 m) will be perceived as compressed. So, an object at a two-meter viewing distance is perceived as four times flatter than the same object at a half meter viewing distance.

These distortions, if actually present, would represent gross failures of the veridical perception of shape. How can one function in everyday life in the presence of such gross errors? As discussed above, the most common, contemporary answer invokes familiarity with the shapes of common objects. Specifically, when an object's shape on an observer's retina changes, as it does whenever the viewing position changes, the perceived shape of the object remains constant because the object has become familiar through repeated viewings. This widely accepted learning explanation is not satisfying when applied to 3D shape constancy because it (i) provides no hint of an underlying computational mechanism and (ii) suggests that there will be large individual and interspecies differences in the accuracy of 3D shape perception. This second point, if true, would make it almost impossible for individuals to interact effectively within their natural environment. There is a more satisfying explanation, however, and it is supported by data showing that the perceived shapes of abstract, unfamiliar 3D objects are actually perceived veridically. Furthermore, these veridical percepts were very reliable, varying little from trial to trial, between viewing conditions, or among observers. Finally, the evidence illustrates how veridical 3D shape perception can be enhanced by combining stereoacuity information with a symmetry constraint in a computational binocular model developed to recover a 3D shape from a 2D image monocularly.

The main premise of some of the present models of perception of a 3D shape is that the perceived shape cannot be reconstructed from the perceived depth of an object's surfaces. Instead, the perception of a 3D shape can be recovered from 2D retinal images by the operation of a priori simplicity constraints. Neither learning nor depth necessarily plays any role. The present approach is supported by a computational monocular model that recovers a complex 3D shape from a single 2D image very well, as discussed above in Section 3. Human observers also recover 3D shape from a 2D image very well. Large recovery errors are rare, and when they do occur, the errors made by the model described herein and by human observers are almost identical. N.B., recovering a 3D shape from a single 2D image is mathematically "intractable" because this problem is underconstrained. A single 2D image is consistent with infinitely many 3D interpretations. The monocular model described herein uses four a priori simplicity constraints to produce a unique, accurate recovery: viz., 3D symmetry, maximal 3D compactness (compactness is defined as $V^2/S^3$, where V is volume and S is surface area of the 3D object), minimum surface area and maximum planarity of contours. The model first forms a one-parameter family of 3D symmetric shapes that could produce the given 2D orthographic image. All 3D shapes in this infinitely large family are symmetrical—they differ only with respect to their aspect ratio. The shape "perceived" (recovered) by the model is the 3D shape that maximizes a weighted average of 3D compactness and the surface area. For the embodiments described herein, equal weights were applied and worked well, though other embodiments using other metrics may apply other weights as will occur to those skilled in the art. The present computational model not only recovers a unique 3D shape, it also recovers the back, invisible part of the shape, as well as the visible part of the shape up front. Most importantly, the 3D shape is recovered without requiring any use of depth. In most embodiments, depth actually emerges as a byproduct of the recovered 3D shape.

Given the success of this monocular model, one might expect that adding a view of the stimulus by viewing it binocularly would permit disparity to operate and improve the performance observed monocularly by at least the amount expected from probability summation. Actual experimental data showed, however, that the binocular performance of both the model and the observers was much better than expected from probability summation. The addition of a second eye reduced variability by at least a factor of three, and even more importantly, performance was veridical—no systematic error was observed.

A baseline control experiment was performed to explore the potential role of disparity in 3D shape perception by working with the kind of inappropriate stimulus that had been used in much prior work on this problem. This stimulus was a pyramid viewed from a degenerate viewing direction, a stimulus that contains no useful information about shape. It provides no useful information because changing the 3D shape, when it is viewed from this direction produces no, or almost no, change of the shape of its retinal image. This is what is meant when the viewing direction is called "degenerate." This is exactly what happens whenever simple 2D stimuli such as ellipses or triangles are used. This also happens whenever simple 3D shapes, such as pyramids or ellipsoids, are viewed from a degenerate viewing direction. From the point of view of the observer, simple shapes like these actually do not manifest the property called "shape", which inheres in the object and persists regardless of changes of the observer's viewing direction.

Note that useful shape information is always available whenever quadrilaterals, parallelepipeds or 3D objects at non-degenerate viewing directions are used as stimuli in such experiments. Observers in the present experiment's shape-free control condition viewed two rectangular symmetrical pyramids binocularly at near (75 cm) and far (125 cm) distances, from degenerate viewing directions, and were asked to match their aspect ratios. The far pyramid was perceived as flatter by a factor of 1.5 (see FIG. 12, orange curve). This is the kind of systematic error that has been mistakenly taken as evidence for the failure of veridical 3D shape perception in certain prior work. It is obviously an error in depth perception, not in shape perception. It only occurs with a restricted class of simple stimuli when they are viewed from degenerate directions (see above).

Figure 12:
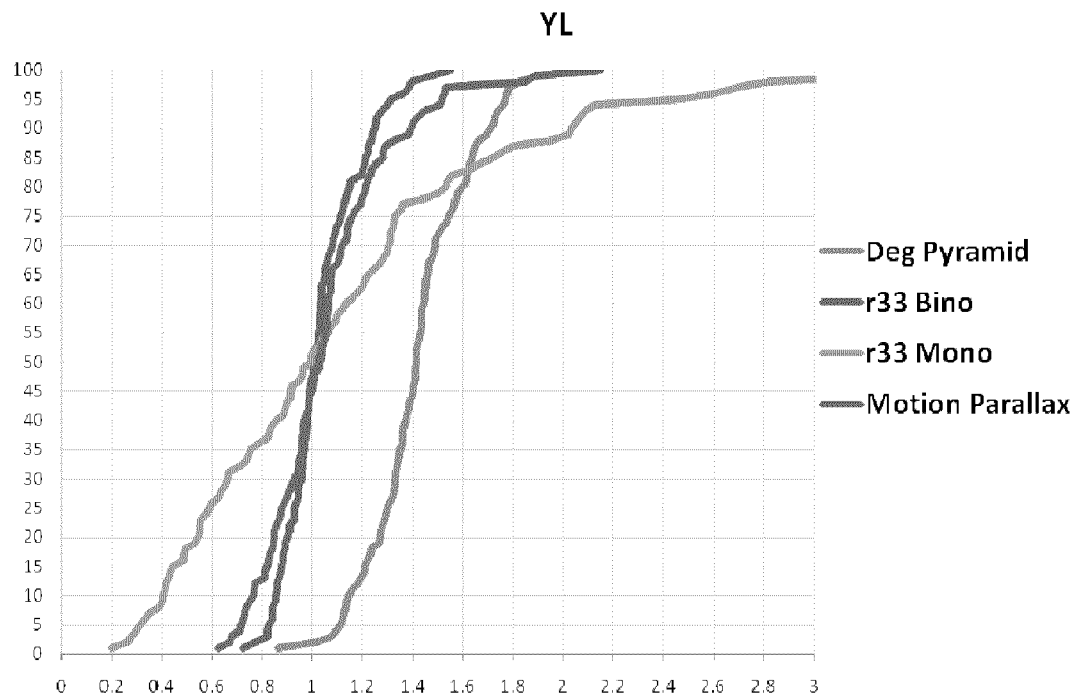
FIG. 12 is a graph of the performance of one subject using various types of shape reconstruction; namely, showing the reconstructed aspect ratio divided by the true aspect ratio on the horizontal axis, and showing the "cumulative probability distribution of errors" on the vertical axis.

Now that the baseline variability and systematic errors characteristic of our observers' depth perception had been established, we went on to test their 3D shape perception under more appropriate stimulating conditions. In particular, all conditions were the same, except that a complex symmetrical polyhedron was viewed from non-degenerate viewing directions. This stimulus, which manifests the property we call "shape," allowed the observers to perceive its shape veridically. Note that this kind of stimulus is very much like the stimuli human beings deal with routinely in everyday life. The resulting binocular perception of 3D shape, represented in FIG. 12 by the red curve, was not only much better than monocular perception (monocular static performance is represented in FIG. 12 by the green curve), it was also much better than expected from probability summation alone. It was almost perfect! Variability was very small and systematic errors were not observed.

Finally, 3D shape perception was tested by having the observers view a complex polyhedron monocularly, while the 3D shape oscillated left and right around a vertical axis by the small angle corresponding to the angle formed by the two eyes when the shape was viewed binocularly. This provided the observer with the same information as binocular viewing, except that the two images were presented sequentially, rather than simultaneously. It was found that the monocular perception of a rotating 3D shape was as veridical as the binocular viewing of a stationary 3D shape (the purple line in FIG. 12). In other words, monocular movement parallax proved to be as effective as binocular disparity in enhancing the veridicality of a recovered 3D shape.

Now that a role for disparity in human shape perception had been established, the monocular computational shape recovery model was modified to examine the extent to which adding a second view would improve its recovery of 3D shape. In the binocular model, the computation of 3D shape first recovers a one-parameter family of 3D symmetric shapes from a single 2D retinal image in one of the eyes. Once this is done, the relative depth order of the visible points is established. In other words, stereoacuity is brought into play by using threshold values that have been established for human observers. This additional information restricts the range of possible aspect ratios appreciably. The final step, "selecting the unique 3D shape percept," is accomplished by choosing the specific 3D shape that maximizes the weighted average of the maximal 3D compactness and minimum surface area from what is now a very small range of possible 3D shapes. Said slightly differently, this is the same computation that was used in the monocular model, but here, the range of possible values has been restricted by information about the relative depth order that was produced by having binocular input. Note that this binocular model accomplishes what seems to be impossible in conventional mathematics, namely, it recovers metric 3D shape extremely well by combining two non-metric features, i.e., by combining our symmetry constraint, which produces a one-parameter family of shapes, with the binocular depth order.

FIG. 12 illustrates performance of one subject using: (a) monocular shape reconstruction without motion (green line—"r33 Mono"), (b) binocular shape reconstruction (red line—"r33 Bino"), (c) monocular shape reconstruction in the presence of motion (purple line—"Motion Parallax"). (d) the orange line shows results biased by using inappropriate stimulus and viewing direction (orange line—"Deg Pyramid"). The horizontal axis (x) shows the reconstructed aspect ratio divided by the true aspect ratio, so an x value of "1" represents perfectly accurate reconstruction. The vertical axis shows the "cumulative probability distribution of errors," that is, the probability that the error in the perceived aspect ratio is not greater than x times the true aspect ratio. For the monocular static, binocular and monocular with motion conditions the percept was (on average) accurate. Specifically, the $50^{th}$ percentile (median) of the responses was equal to 1. The slope of the lines representing binocular viewing and monocular viewing with motion was 4 times steeper than the slope of the line representing monocular static viewing. This means that adding the second image improved the precision of the shape reconstruction performance by a factor of 4.

7. Additional Remarks

In various embodiments, certain components of the systems described above will be replaced by other components or removed altogether. Other embodiments expand on the principles, ideas, systems, and methods described herein to yield additional value or unexpected results.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system, comprising:
    a processor and
    a memory in communication with the processor, the memory storing programming instructions executable by the processor to:
        from a 2D image, define a family of 3D models of objects consistent with that image;
        automatically select one of the 3D models as a function of at least one of a compactness metric, and a surface area metric as applied to the family of 3D models; and
        generate human-discernable output as a function of the selected 3D model.

2. The system of claim 1, wherein the programming instructions are further executable to determine the degree of asymmetry of the selected 3D model using an asymmetry metric that is a function of the difference between corresponding angles in the respective halves of the 3-D model about a plane of symmetry.

3. The system of claim 2, wherein the asymmetry metric is a function of the sum of the squares of the differences between corresponding angles in the respective halves of the 3-D model about a plane of symmetry.

4. The system of claim 1, wherein the selection function is a compactness metric that is a function of $V^2/S^3$, where V is volume and S is surface area of the 3D model.

5. The system of claim 1, wherein the automatic selection is performed as a function of both a compactness metric and a surface area metric as applied to the family of 3D models.

6. The system of claim 1, wherein the automatic selection is performed as a function of a compactness metric, a surface area metric, a three-dimensional symmetry metric, and a planarity of contours metric as applied to the family of 3D models.

7. The system of claim 1, wherein the programming instructions are further executable by the processor to, between the operation of defining a family of 3D models and the operation of automatically selecting one model from that family:
    using a second image of the same object, determine the relative depth order of two or more visible points on the surface of the object; and
    removing one or more 3D models from the family that are inconsistent with the determined relative depth order.

8. A method for identifying a 3D object consistent with that seen in a 2D orthographic original image, comprising:
    characterizing a one-parameter family of symmetric polyhedra derived from the original image as a function of an angle of rotation about an axis;
    if one or more vertices are hidden in the family of polyhedra, recovering the one or more hidden vertices; and
    automatically choosing a 3D result shape from the family of polyhedra as a function of a constraint that is selected from the family of constraints consisting of:
        a compactness constraint and
        a surface area constraint.

9. The method of claim 8, further comprising:
    if the projected symmetry lines in the original image are not all parallel, then before the characterizing step, distorting the original image to yield an image consistent with a symmetric 3D object;
    generating a corrected family of polyhedra by:
        if projected symmetry lines in the original image were all parallel, using the characterized one-parameter family; and
        if projected symmetry lines in the original image were not all parallel, reversing the distortion after the generating step; and
    performing the applying on the corrected family of polyhedra.

10. The method of claim 8, further comprising, before the recovering, adapting the image so that an average orientation of the projected symmetry line segments is in the selected direction, then acting upon the adapted image thereafter.

11. The method of claim 8, wherein the recovering comprises applying a planarity constraint by:
    identifying at least three vertices of a face of the polyhedron;
    determining the location of a visible vertex of the face of the polyhedron by applying an assumption that the face is planar; and
    recovering a hidden vertex by reflecting the visible vertex with respect to the symmetry plane of the shape.

12. The system of claim 8, further comprising evaluating the degree of asymmetry of the selected 3D model using an asymmetry metric that is a function of the difference between corresponding angles in the respective halves of the 3-D model about a plane of symmetry.

13. The method of claim 12, wherein the asymmetry metric is a function of the sum of the squares of the differences between corresponding angles in the respective halves of the 3-D model about a plane of symmetry.

14. The method of claim 8, wherein the selection function is a compactness metric that is a function of $V^2/S^3$, where V is volume and S is surface area of the 3D model.

15. The method of claim 8, wherein the selection function is a function of both a compactness constraint and a surface area constraint.

16. The method of claim 8, wherein the selection function is a function of a compactness constraint, a surface area constraint, a three-dimensional symmetry constraint, and a planarity-of-contours constraint.

17. The method of claim 8, further comprising:
    after the step of characterizing and before the step of choosing, using a second 2D image to put into depth order two or more visible points on the surface of the object; and
    wherein the choosing is performed from among the part of the family having limited values of the one parameter that are limited by application of the depth ordering.

18. A system for processing a 2D original image of a 2D shape, the original image having projected symmetry line segments, comprising:
    a processor and a memory in communication with the processor, the memory storing programming instructions executable by the processor to:
        produce a virtual image of the 2D shape by reflecting the corrected image with respect to an axis normal to the selected direction;

characterize a one-parameter family of symmetric polygons derived from the virtual image as a function of an angle of rotation about the axis;

generate a corrected family of polygons by if the projected symmetry lines in the original image are all parallel, using the characterized one-parameter family; and if the projected symmetry lines in the original image are not all parallel, reversing the correction applied in the generating step; and automatically select an output polygon by shearing the corrected family of polygons along the projected symmetry line segments.

* * * * *